United States Patent [19]

Rollins

[11] Patent Number: 4,990,057
[45] Date of Patent: Feb. 5, 1991

[54] ELECTRONIC CONTROL FOR MONITORING STATUS OF A COMPRESSOR

[75] Inventor: Douglas J. Rollins, Goshen, Ind.

[73] Assignee: Johnson Service Company, Milwaukee, Wis.

[21] Appl. No.: 346,749

[22] Filed: May 3, 1989

[51] Int. Cl.$^5$ .............................................. F04B 49/02
[52] U.S. Cl. ........................................ 417/12; 417/13; 417/18; 417/32; 417/33; 417/44; 417/53; 417/63; 184/64; 184/108
[58] Field of Search .................... 417/12, 13, 18, 32, 417/33, 44, 53, 63; 361/22; 184/6.3, 6.4, 6.16, 108

[56] References Cited

U.S. PATENT DOCUMENTS

| | | |
|---|---|---|
| 1,173,415 | 2/1916 | Windeler . |
| 3,721,866 | 3/1973 | McIntosh ............................. 361/22 |
| 4,038,061 | 7/1977 | Anderson et al. ..................... 361/22 |
| 4,281,358 | 7/1981 | Plouffe et al. ......................... 361/22 |
| 4,336,001 | 6/1982 | Andrew et al. ....................... 417/310 |
| 4,502,084 | 2/1985 | Hannett ................................. 361/22 |
| 4,510,547 | 4/1985 | Rudich, Jr. ............................ 361/24 |
| 4,672,231 | 6/1987 | Sutton et al. ......................... 307/118 |
| 4,674,335 | 6/1987 | Wendt ................................... 73/745 |
| 4,712,648 | 12/1987 | Mattes et al. ......................... 184/6.4 |

Primary Examiner—Leonard E. Smith
Assistant Examiner—David W. Scheuermann
Attorney, Agent, or Firm—Foley & Lardner

[57] ABSTRACT

The compressor controller includes a timing circuit for timing-out a detected fault in a compressor. Upon the fault existing for longer than a predetermined time limit, the controller removes power from the compressor. If the fault is corrected within the predetermined time limit, even momentarily, the timing process is discontinued and the controller continues to monitor the status of the compressor. The controller also includes a delay timer for delaying the re-energizing of the compressor after an interruption or loss of power occurs. The delay prevents short cycling of the compressor. The controller further includes a status display for indicating compressor functions, connections to an alarm which is initiated in the event of compressor failure, a switch for initiating a self test of the controller, and circuitry for a field applied current sensing relay.

14 Claims, 4 Drawing Sheets

ELECTRONIC CONTROL FOR MONITORING STATUS OF A COMPRESSOR

BACKGROUND OF THE INVENTION

This invention relates generally to a controller for an electrically driven compressor and more particularly to a compressor controller for monitoring various compressor operating parameters and controlling the power supplied to the compressor.

Several known compressor control apparatus are configured for monitoring the lubrication pressure of a compressor and de-energizing the compressor in the event that a condition of low pressure is detected. Such low pressure detection devices usually take the form of a relay or switch which immediately shuts off power to the compressor when a condition arises such as the lubrication pressure being below a predetermined level. Other compressor protective devices include separate equipment for protecting the compressor against short cycle operation, protecting the compressor from overloads and protecting the compressor from accelerated wear in the event that the compressor lubricating oil system malfunctions.

While these prior art devices have heretofore been satisfactory for compressor control, they have failed to appreciate the advantages of providing an integrated compressor controller which is responsive to a plurality of operating parameters of the compressor. In particular, the prior art fails to provide a time period for allowing the lubrication pressure to develop to the proper level. Many of the prior art systems are plagued with excessive compressor stoppages due to initially inadequate lubrication pressure without allowing the system to establish the proper pressure in a running state. Further, the conventional systems do not provide an alarm should the lubrication pressure be insufficient for longer than a predetermined time limit. Additionally. the prior art has failed to appreciate a controller which is configured in accordance with the above-mentioned features and to further include a timing delay circuit to prevent short cycling as well as self-diagnostic functions.

SUMMARY OF THE INVENTION

It is therefore an object of the present invention to provide a controller which can selectively control the energization of a compressor based on specific parameters involving the compressor. These parameters can include the interruption or loss of power to the compressor, insufficient lubrication pressure, insufficient current to the compressor motor, and self-testing diagnostics. The described control circuit is responsive to an interruption or loss of power to the control such that the controller will de-energize the compressor and will remain as such for a predetermined time delay or until the system is reset. The controller is further operable to monitor the lubrication oil pressure of the compressor in a manner such that the compressor will not be de-energized until a predetermined time limit has been exceeded. Upon this time limit being exceeded, the compressor is de-energized and an alarm is activated. The system further includes a self-test circuit which simulates a fault in the compressor and exercises certain operations of the control.

The above and other objects, features and advantages of the present invention will become apparent from the following description and the appended claims, taken in conjunction with the accompanying drawings which show the preferred embodiment of the present invention.

DETAILED DESCRIPTION OF THE PREFERRED EMBODIMENT

Figure 1:
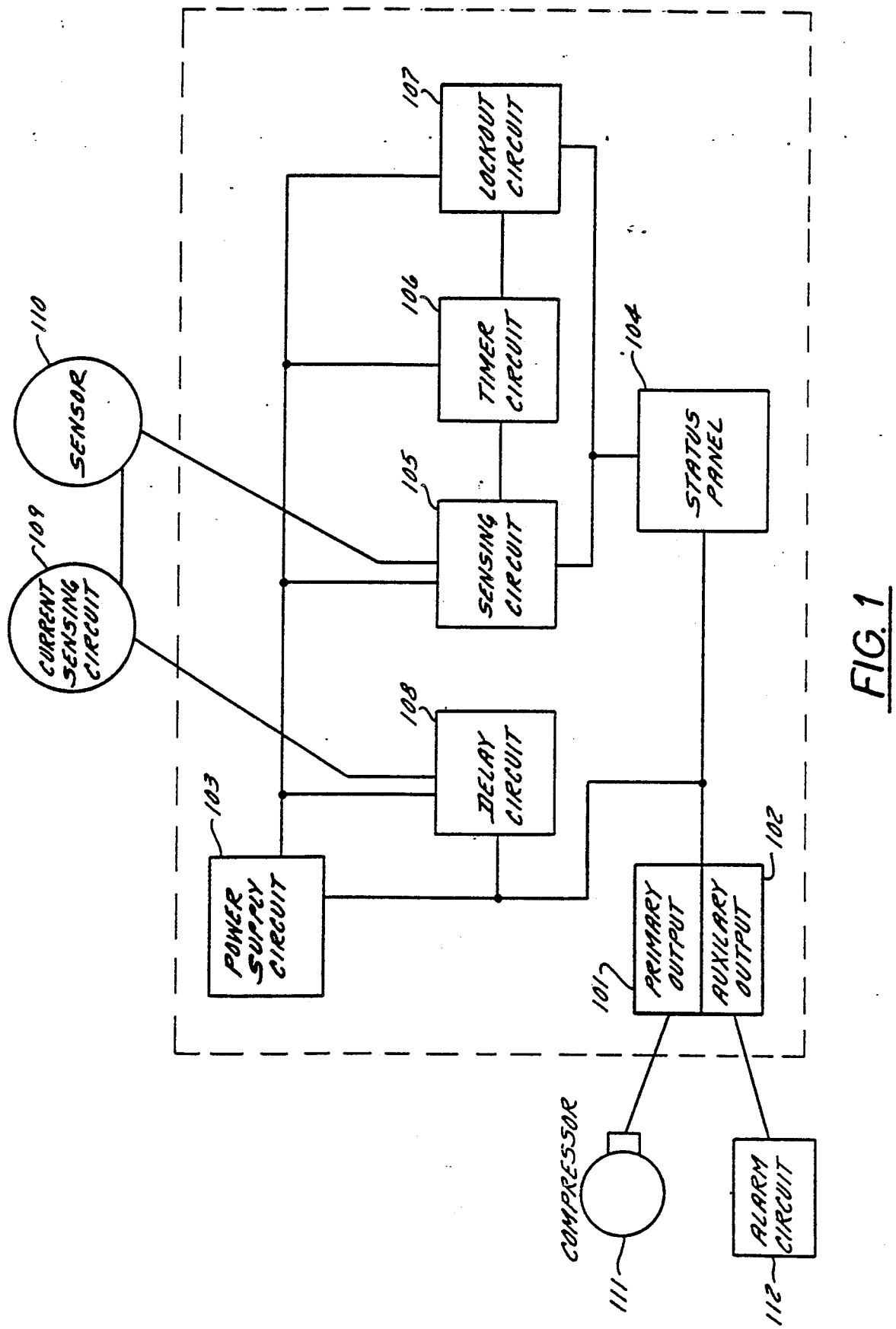
FIG. 1 is a block diagram of the controller according to the instant invention.

Referring to FIG. 1, a brief overview of the present invention is presented.

The present invention is directed to an electronic controller 100 which monitors an electrical signal from a remote sensor 110, in order to control operation of a compressor 111. The remote sensor 110 may take the form, for example, of a hall-effect differential pressure transducer. The sensor 110 monitors a parameter associated with the compressor 111 to detect a fault condition of the compressor 111. A signal from the sensor 110 is sensed by sensing circuit 105 which is connected to a timer circuit 106 which times out a predetermined timing period when a fault is detected. If the fault is not corrected within the timing interval, the controller 100 removes power to the compressor 111 by de-energizing a primary output 101, thus stopping operation of the compressor 111 to protect same. If the fault is corrected within the interval, even momentarily, the timing process aborts, resets, and the controller 100 continues to monitor the status of the compressor 111.

The controller 100 of the present invention does not operate as an operating control, but rather is provided to protect the compressor 111 from operating in a fault condition such as, for example, from operating without adequate lubrication pressure. If the fault is not corrected within the previously mentioned timing period, the controller 100 in effect stops the operation of the compressor 111. This stoppage is referred to as a lockout. The controller 100 must then be manually reset. The lockout condition is carried out by the lockout circuit 107.

The system further incorporates a status display 104 to indicate compressor function, an isolated auxiliary output 102 which activates a remote alarm circuit 112 in the event of compressor failure, an anti-short cycle delay circuit 108 for preventing short cycling of the compressor 111, and circuitry for a field applied current sensing relay 109.

The present invention is powered by power supply circuit 103 which provides 120 or 240 VAC, 50 or 60 Hz. The controller 100 internally generates 6.5 and 5.0 volt DC supplies and provides the voltage supply for the remote sensor 110.

Figure 2A:
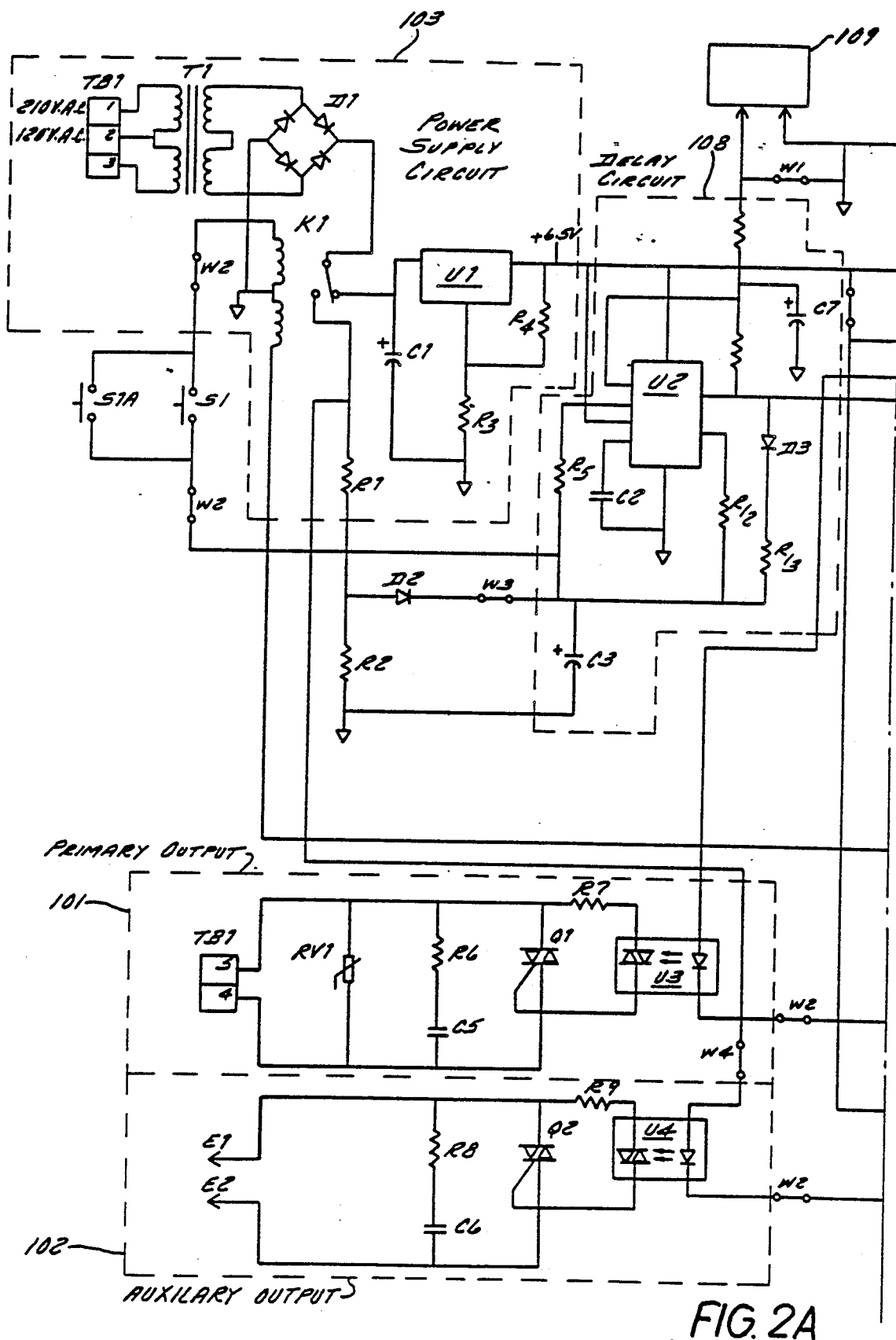
FIG. 2A and 2B are detailed schematic diagrams of the controller of FIG. 1.
Figure 2B:
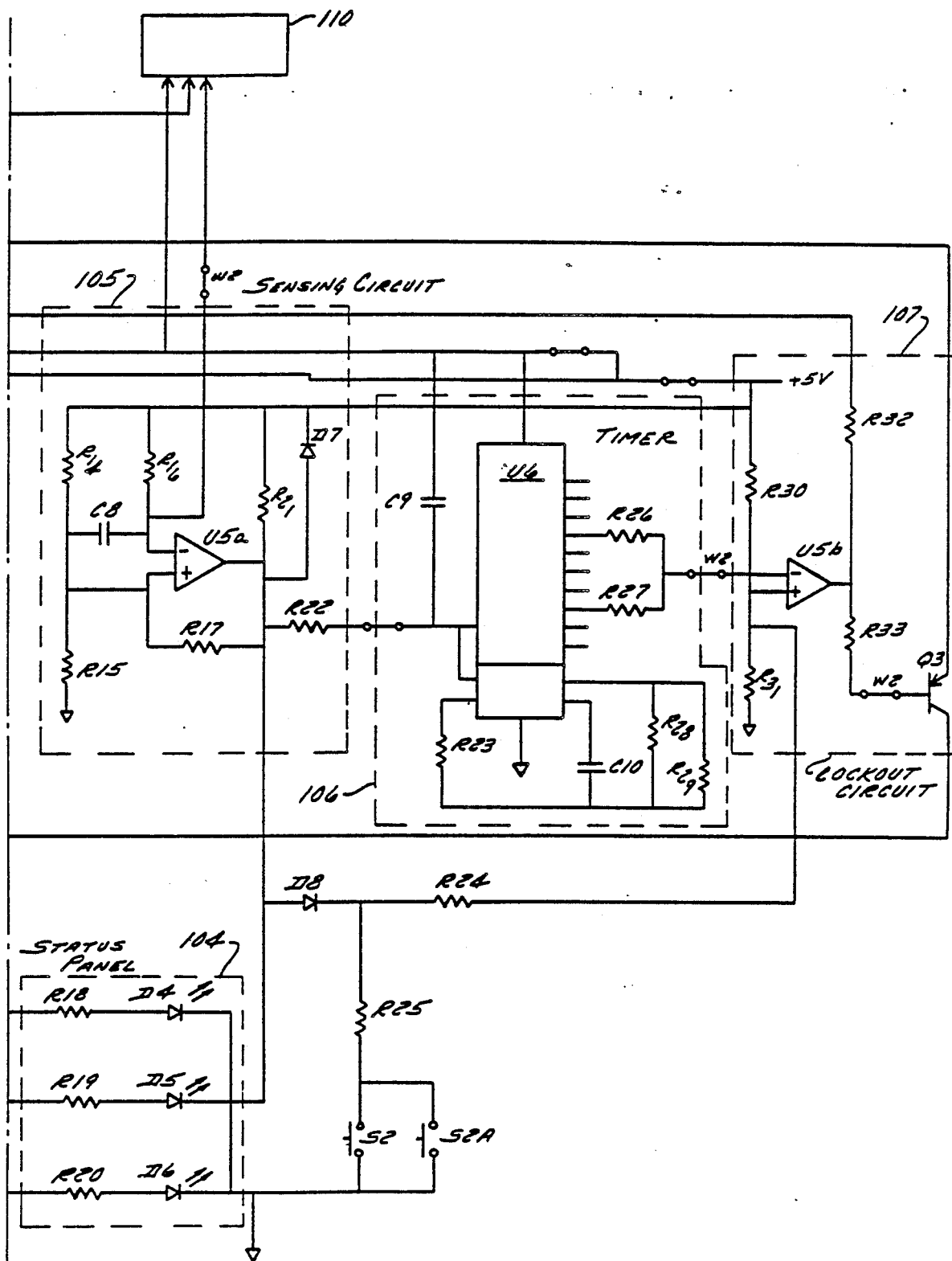

Referring now to FIG. 2, a more detailed explanation of the circuitry involved is presented.

The primary output 101 of the controller 100 includes an isolated triac Q1 which energizes the field installed contactor connected to TBI, which in turn powers the compressor 111. The triac Q1 is connected between terminals L and M of TBl. It is protected by RVI (a 275 VAC voltage suppressor) and by a snubber circuit comprised of resistor R6 and capacitor C5. Triac Q1 is gated by an optical isolator U3 through a current limiting resistor R7. Isolator U3 is an opto-triac which provides high voltage isolation between the output 101 and the circuitry of controller 100, and is energized by a DC current.

The auxiliary output 102 includes another triac Q2 intended to activate the alarm circuit 112. Triac Q2 is connected to terminals AL1 and AL2 and is also protected by a snubber made up of resistor R8 and capacitor C6. It is energized by isolator U4 (another opto-triac) through a current limiting resistor R9. Isolator U4 again provides isolation between high and low voltages in the circuit and its input is energized by the controller 100 only when a lubrication lockout condition occurs.

The power supply circuit 103 consists of transformer T1, diode bridge D1, capacitor C1, voltage regulator U1, and resistors R3 and R4. Transformer T1 is a dual primary transformer capable of either 120 VAC using one primary winding, or 240 VAC using both windings, as determined by the input terminals (labelled 240 VAC, 120 VAC, and 2, respectively, with 2 being the common). Diode bridge D1 is a full wave bridge rectifier which charges the filter capacitor C1 through the reset contacts of a latching relay K1 Voltage regulator U1 is an LM317 adjustable voltage regulator which is in effect programmed by resistors R3 and R4 for an output voltage of 6.5 volts DC.

The 6.5 volt DC power supply provides power to latching relay K1, to an alarm, such as diode D5 (a yellow LED), and to timer U2 (LM555 timer). The output of timer U2 (pin 3) is bistable and can be set at 0 volts or at 5 volts. The 5 volt output provides power to most of the functions of the control. The purpose of timer U2 will be explained infra.

The controller 100 has three light emitting diodes mounted to an upper status panel 104 within the controller 100 so that the LEDs protrude through the cover of the controller. These LEDs are green, yellow, and red, and are denoted D4, D5, and D6, respectively.

The green LED D4 is illuminated by the 5 volt power supply and is in the same current path as the output isolator U3. Consequently, the green LED D4 is illuminated anytime the primary output 201 is powered. Resistor R18 serves as the current limit for both D4 and isolator U3. The green LED D4 is extinguished anytime power is removed from the primary output 101, including the lockout condition.

The yellow LED D5 is powered by the 6.5 volt supply and current limiting is carried out by resistor R19. However, there is no circuit path to common unless a fault occurs; therefore, the illumination of the yellow LED D5 indicates a problem. The yellow LED D5 is extinguished by the lockout condition or correction of the fault.

The red LED D6 is powered only during a lockout condition of the controller 100. This LED is in the current path of the alarm isolator U4 and is always powered with the alarm 112. Resistor R20 is the current limiter to both devices. Due to the occurrence of the lockout condition, D6 will never be illuminated with either of the other two LEDs.

The remote sensor 110 (e.g. differential pressure transducer), is connected to the controller 100 with a three pin connector P1. The pins are the 5 volt supply (pin 1), circuit common (pin 2), and the sensor signal to the controller 100 (pin 3). In the case of a Hall-effect transducer used as the remote sensor, the output of the sensor is a voltage which varies inversely with pressure and swings from 3 volts to 2 volts as pressure varies from zero to 20 PSIG.

The sensing circuit 105 consists of voltage comparator U5a (one half of an LM393 dual voltage comparator), resistors R14, 15, 16, 17, 21, and 22, and capacitor C8. The voltage signal from the sensor 110 is the inverting input to the voltage comparator U5a and the non-inverting input is a reference voltage. This reference voltage is 50% of the 5 volt supply and is formed by the voltage divider of R14 and R15.

When the differential pressure is low, the sensor signal will be above the 2.5 volt reference and the output of the comparator U5a will be low. As the pressure increases, the sensor is calibrated to decrease below 2.5 volts once adequate pressure is achieved. Once this occurs, the reference voltage will exceed the sensor voltage, and the comparator U5a output will be pulled high due to the pull-up resistor R21. Resistor R17 is a positive feedback resistor provided to aid this transition and capacitor C8 is connected between the comparator U5a inputs to improve operation thereof. Resistor R16 is a pull-up resistor on the sensor input that allows the controller 100 to interpret a missing or unconnected sensor as an inadequate pressure state to initiate a time-out of the controller 100.

The low state at the comparator U5a output provides a current path for the yellow LED D5. Consequently, D5 is illuminated by the low pressure indication and extinguished when the comparator is satisfied. During this time D4, the green LED, will remain illuminated along with the yellow LED D5, since the output 101 is still energized.

The timer circuit 106 of the controller 100 includes a precision 43-second timer U6 which is activated by the low output state from comparator U5a. Once initiated, the timing process can be aborted anytime throughout its duration by re-establishing satisfactory lubrication pressure, even if only momentarily. The timing periods are non-accumulating, meaning that satisfactory pressure not only aborts the timing process, but resets the timer U6 to zero. Consequently, the controller 100 cannot initiate a lockout condition unless it perceives uninterrupted inadequate pressure for the duration of the timing cycle. If the timing period is allowed to continue to completion, it initiates a signal to the lockout circuit 107.

The timer circuit 106 is comprised of timer U6, resistors R23, R26, R27, R28, R29, and capacitors C9 and C10. Timer U6 is a CMOS CD4060 oscillator/divide-by-n counter. Pin 12 of timer U6 is the reset terminal and is connected via R22 to the output of comparator U5a. The timer U6 is enabled by a low state at pin 12 which corresponds to inadequate lubrication pressure. A high state at pin 12 disables the timer and resets the timer to a zero count state. Capacitor C9 pulls the reset high on every power-up, thus resetting the timer U6 to zero. Resistors R28, R29, R23 and capacitor C10 define the oscillator frequency which oscillates at 47.45 Hz.

The outputs of timer U6 (pins 1 and 6) are both low during normal operation. When the reset pin 12 is pulled low by the sensing circuit 105, the timer U6 starts operating. This causes pin 6 to go high every 1.35 seconds and pin 1 to go high after 43.2 seconds. Resistors R26 and R27 form a voltage divider with the junction connected to the lockout circuit 107. When pin 6 goes high, this junction rises from 0 volts to 2.5 volts, but when pins 1 and 6 both go high, the junction rises to 5 volts.

The output of timer U6 is connected to the lockout circuit 107 which comprises comparator U5b and PNP transistor Q3. Specifically, the output pins 1 and 6 of timer U6 are connected to the inverting input of comparator U5b (the other half of the LM 393) via resistors R26 and R27. The non-inverting input is connected to a voltage divider formed by resistor R30 and R31 which holds this input at 2.75 volts. Since the non-inverting input is held higher than the inverting input during normal operation, the output of the comparator U5b is held high by resistor R32 which is a pull-up to the 6.5 volt supply. This high level biases the PNP transistor Q3 to turn off.

During a condition of inadequate lubrication pressure, the timer U6 is running and the inverting input of comparator U5b is shifting from zero to 2.5 volts, however, the non-inverting input is held at 2.75 volts so the comparator output remains high. However, when the high level output is generated by U6 after 43.2 seconds, the junction of R26 and R27 is caused to go to 5 volts, thus exceeding the voltage at the non-inverting input. The output of comparator U5b then goes to zero, thus forward biasing the transistor Q3 through resistor R33. When transistor Q3 turns on, a connection is made to the set coil of relay K1 to the 6.5 volt DC supply, thus "setting" the relay contacts.

The relay action of the relay contacts opens the circuit between relay pins 7 and 10 and closes pins 7 and 12. The same relay action removes power from the DC power supply circuit, thus collapsing the 6.5 and 5 volt supplies and removing power from the transducer 110, the timer circuit 106, and the isolator U3. The relay action also terminates the control output to the contactor (L and M) of primary output 101 and extinguishes the green LED D4 since it was powered by the same signal. Additionally, the yellow LED D5 is extinguished by the loss of supply and transistor Q3 ceases to conduct.

The relay contact closure of pins 7 and 12 accomplishes two objectives. First, through current limiting resistor R20, the contact provides power to the red LED D6, indicating a lockout condition has occurred, and provides power to the alarm isolator U4, thus enabling the auxiliary output 102 to the alarm circuit 112. Secondly, power is applied to resistors R1 and R2 which form a voltage divider holding the junction between them at approximately 8.0 volts peak. This forward biases diode D2 into conduction effecting the charging of capacitor C3 to the 8.0 volt level. Since the contact closure of relay K1 is a mechanical latch, it will act as a memory for the controller 100 and will not allow the circuit to be reset by a power outage. The relay K1 will remain stable in this lockout condition until it is manually reset.

Reset is accomplished by depressing switch S1, which is a momentary contact pushbutton located on the cover panel of the controller 100. The switch action of S1 discharges C3 through the reset coil of K1, transferring the contacts back to the run state and reestablishes the normal operating conditions previously described. If no lubrication pressure is indicated by the sensor 110, the controller 100 will repeat the timeout process and return to the mechanical lockout condition. In addition to restoring power after a lockout, the reset switch will also abort the 100 second timing delay restoring operation immediately, if desired. The reset switch S1 is a momentary contact and cannot be defeated by locking it down. The controller 100 will still go to lockout and the switch S1 will have to be released and then depressed to restore operation.

Another feature of the controller 100 is a system test switch S2 which is located on the cover panel of the controller 100 along with the LEDs and the reset switch S1. The system test switch S2 simulates a lubrication problem to the controller 100, initiates an abbreviated timing cycle and then effects a lockout condition. This feature exercises all of the LEDs on the status panel 104, the timer circuit 106, and the mechanical lockout relay K1. The timer circuit 106 is activated in response to the output of the comparator being pulled low through diode D8. It also provides a serviceman of the system an easy way to stop the compressor 111 if necessary.

The system test switch S2 is a momentary contact switch which pulls the output of comparator U5a low through diode D8 and resistor R25. The low output of comparator U5a indicates a loss of lubrication pressure to the timer circuit 106 and starts the timer. The switch action also pulls the non-inverting input of comparator U5b down to about 0.5 volts through resistor R24. Due to timer oscillation, the inverting input of U5b switches every 1.35 seconds from 0 to 2.5 volts. Consequently, after the switch S2 has been held down for 1.35 seconds, comparator U5b will switch, turning on Q3, setting the relay contacts of K1, and placing the controller 100 into a lockout condition. Pushing the reset switch S1 will restore normal operation.

The system test circuit includes the momentary switch S2 on the status panel 104 of the controller 100 that, when depressed, simulates a fault to the controller 100 and initiates an abbreviated timing interval of one to three seconds, followed by lockout of the controller 100. The test verifies the operation of the fault timing circuit, the lockout circuit 107 and the associated LEDs. This function is also useful for a serviceman who is required to shut the compressor down. Operation is restored, just as in normal lockout, by depressing the reset switch S1 which is also located on the status panel 104.

The function of timer U2 is somewhat extraneous to the operation of the lockout circuit 107. It is oftentimes necessary to provide other needed features, such as an anti-short cycle delay circuit 108, and to act as an interface for the current sensing relay 109 that is sometimes needed.

Short cycling is an industry term referring to rapid start and stop operations of a compressor. This type of operation is damaging to a compressor and can be caused by brief power failures, failure of operating controls, etc. The anti-short cycle delay circuit 108 is an automatic reset time delay with a duration of approximately 100 seconds. In addition to the permanent mechanical lockout previously described, the primary output 101 of controller 100 can be temporarily de-energized by the anti-short cycle delay circuit 108. This de-energization does not involve the latching relay K1, the red LED D6, nor the alarm circuit 112.

In the situation where power to the controller 100 is interrupted, de-energizing the primary output 101, the delay circuit 108 will hold the primary output 101 off for 100 seconds. The time delay starts when power is removed from the controller 100. When power returns, the yellow LED D5 will illuminate while the green LED D4 remains off. This display indicates that the system is timing out and that the primary output 101 will be restored automatically at the end of the timing period. If the power outage exceeds the 100 seconds, the time delay will elapse during the outage and the primary output 101 will be restored immediately upon the return of power. When the delay period expires, the primary output 101 and the green LED D4 will return, and the yellow LED D5 will revert to a pressure indicator as before. If desired, this time delay can be aborted while in process by depressing the reset switch S1. Reset will restore the primary output 101 immediately. The delay circuit 108 comprises timer U2, resistors R10, R11, R12, R13, R5, capacitors C2, C3, C7, and diode D3.

Timer U2 is an LM555 timer being used here much like a comparator. When power is applied, the trigger input (pin 2) of timer U2 is initially low due to timing capacitor C3 being discharged. This causes the output of timer U2 (pin 3) to be high, typically 5 volts, and causes the charging of capacitor C3 through diode D3 and resistor R13 to about 4.3 volts, thus removing the trigger level from pin 2. The output of timer U2 also provides the power to the remote sensor 110, the sensing circuit 105, the timer circuit 106, the green status LED D4 and to the primary output 101. In addition, this output charges capacitor C7 through resistors R11 and R10 to 2.5 volts which is applied to the threshold input (pin 6) of timer U2. Once triggered, the output of timer U2 will stay high without the presence of the trigger until the voltage on the threshold input exceeds ⅔ of the supply (about 4.3 volts). Since the threshold is held at 2.5 volts, pin 3 remains high.

If power is removed from the controller 100, the 6.5 volt supply collapses, but the threshold and trigger inputs (pin 2 and pin 6) of timer U2 are held high by the capacitors C3 and C7, causing the output of timer U2 to go to zero. Once this occurs, capacitor C7 discharges rapidly through resistor R10, and capacitor C3 discharges slowly through R12 into pin 7 of timer U2. If power is restored to the controller 100 during this slow discharge time, the 6.5 volt supply will return; however, the 5 volt supply will not. Since capacitor C3 is high, there is no trigger input for timer U2 and the 5 volt supply remains at zero. The primary output 101 of the controller 100 is driven by the 5 volt supply, and therefore, the output triac Q1 and the green LED D4 remain off. The yellow LED D5 is powered through the 6.5 volt supply and grounded through D7 into pin 3 of timer U2 so as to be illuminated.

After approximately 100 seconds, capacitor C3 has discharged enough to trigger timer U2 and allow the output of timer U2 and the controller 100 to energize again. It should be noted that the discharge of capacitor C3 occurs regardless of when the voltage to the controller 100 is restored; therefore, it functions as providing a minimum off-time, but not necessarily a purge time.

Another function of timer U2 is an input for current sensing relay 109. In certain field installations, there are protective devices (generally thermal interrupts) which can interrupt power to the compressor, but not to the system controller. When this occurs, the system perceives a loss of lubrication pressure without realizing the compressor has stopped. The system then times out and locks out, thus removing power from the compressor contactor. When the field interrupt device resets, the compressor remains off due to the lockout of the controller. The aforementioned operation necessitates a serviceman to reset the controller and also gives the erroneous impression that a lubrication problem exists. To eliminate this problem, a current sensing relay 109 is used to disable the controller 100 whenever the primary output 101 of the controller 100 is energized and no current is sensed.

As previously stated, the voltage on pin 6 of timer U2 is held at 2.5 volts by the voltage divider formed by R10 and R11. If the current sensing relay 109 is used, it is necessary to cut a jumper wire W1 and connect the leads from the relay 109 to the quick-connect terminals located adjacent to the jumper. Removing the W11 jumper wire defeats this voltage divider and allows the voltage on pin 6 to rise to the threshold potential of 4.3 volts causing the output of timer U2 to go to zero, thus terminating the output of the controller. Once this has occurred, the timing capacitor C3 will begin a 100 seconds discharge. When the capacitor C3 has discharged, the output of timer U2 and the controller 100 will again be restored, and this will effect the recharging of capacitors C3 and C7. If no current is sensed through relay 109 within two seconds, capacitor C7 will be charged through resistor R11 to the threshold potential again causing operation to cease. Capacitor C3 will again discharge over 100 seconds and the process will repeat. The cycle continues indefinitely. During this 100 second period, only the yellow LED D5 is illuminated indicating the controller 100 is timing, but that the output 101 is not energized. Only when the current sensing relay 109 indicates compressor operation and prevents capacitor C7 from reaching threshold voltage will the primary output 101 remain energized.

Further variations of this circuit can be as follows. The control lockout timing is considered to be 45 seconds since this is an industry standard, even though the nominal time-out of timer U6 is actually 43 seconds. Another industry standard is 120 seconds. Resistors R28 and R29 connected in parallel dictate the oscillator frequency to achieve 43 seconds, however, if resistor R29 is cut and discarded, the lockout timing will be changed to 120 seconds. Obviously, other timings could be used and the anti-short cycle delay circuit 108 could employ other timings. In addition, features such as the LEDs and the alarm can be removed from the control.

Figure 3:
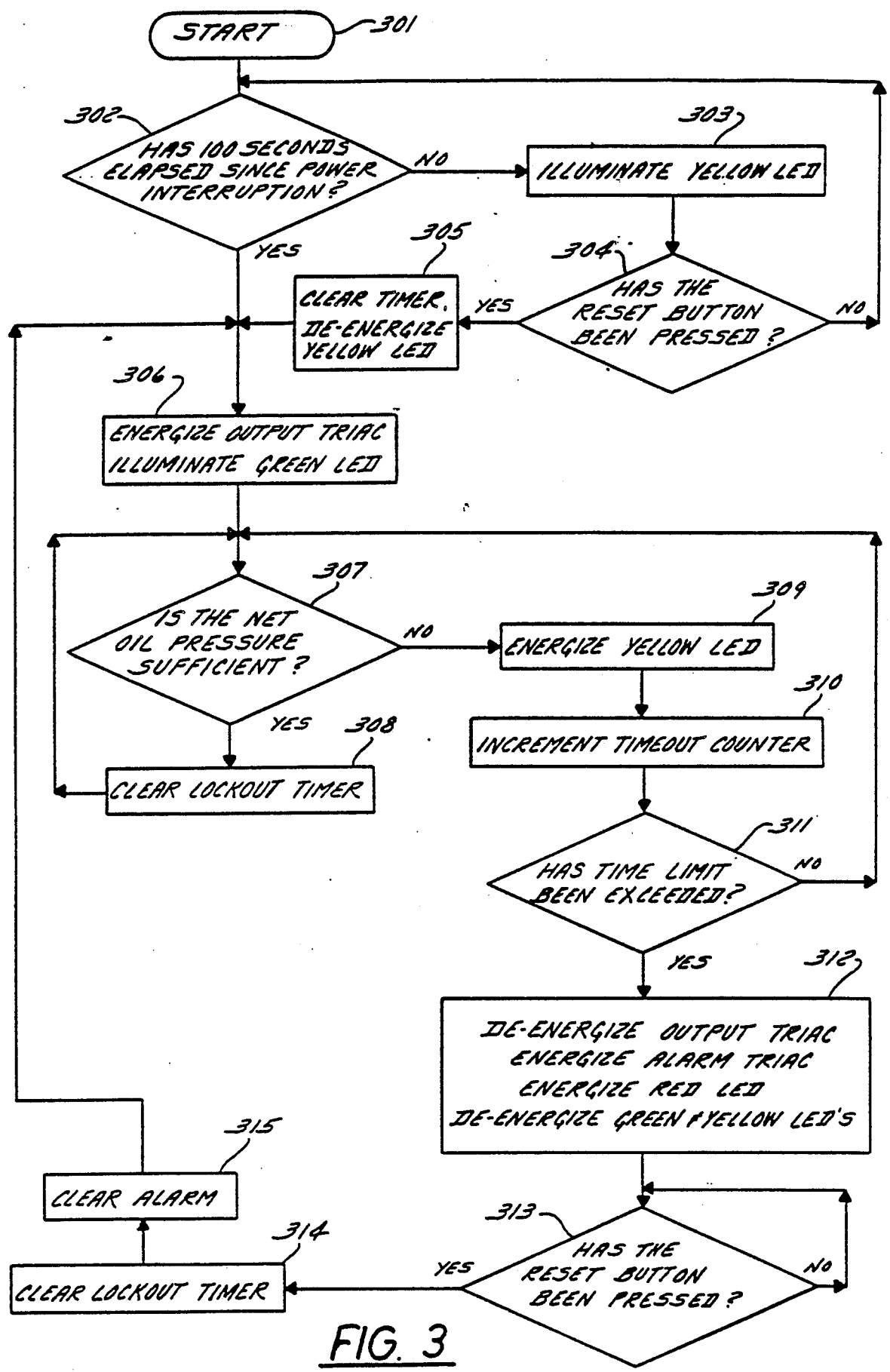
FIG. 3 is a flow diagram illustrating the operational steps of the compressor controller.

Referring now to FIG. 3, the operational steps of the present invention are described hereafter.

In operation, after the initial start-up of the system (Step 301) a determination is made as to whether the 100 second threshold has elapsed since a power interruption or loss to the compressor occurs (Step 302). The controller 100 incorporates the 100 second anti-short cycle delay (independent of the lubrication timing circuit), which removes power from the isolator U3 for a period of 100 seconds on any power interruption to the controller 100, thus preventing short-cycling of the compressor 111. The timing prevents the compressor 111 from rapid stopping and starting during momentary power outages and thus helps avoid having all compressors at a particular site from being re-started simultaneously after a power outage. Such a simultaneous re-start is undesirable due to the power required. If the determination is no, the yellow LED D5 is illuminated (Step 303), and then a determination is made as to whether the re-set switch S1 has been activated (Step 304). If this determination is negative, the flow returns to the initial determination (Step 302). If the re-set switch S1 has been activated, the delay circuit is cleared and reset, and the yellow LED D5 is extinguished (Step 305).

Upon a yes determination in either of the previously mentioned determinations (Steps 302, 304), the controller energizes the isolator U3 so as to allow power to be supplied to the output 101, and simultaneously the green LED D4 is illuminated (Step 306).

The system proceeds to monitor the lubrication pressure of the compressor (Step 307). The controller 100 monitors the signal provided by the remote sensor 110 and compares it to an internal reference voltage with comparator U5a. A voltage below the reference voltage is a yes determination and the controller 100 allows power to remain supplied to the output 101 (Step 308). If the sensor signal exceeds the reference voltage (a no determination), there is a lubrication problem within the compressor 111. When this occurs, the controller 100 starts the timer U6 running which times the duration of the fault and illuminates the yellow LED D5 (Steps 309, 310). This indication on the status panel 104 denotes that the output 101 is powered, but that the controller 100 has detected a fault and is timing toward a lock-out of the compressor 111. The timer U6 will count for 4,096 counts of the internal oscillator, corresponding to a pre-determined time interval typically 45 or 120 seconds (Step 311).

If satisfactory lubrication pressure is restored, even momentarily, within the timing interval, the controller 100 will abort the timing function in progress, reset the timer circuit 106 to zero, extinguish the yellow LED D5, and continue to monitor the remote's sensor signal (Steps 307, 308).

If the pressure remains unsatisfactory for the duration of the timing interval, the timer U6 will generate a signal to the comparator U5b (Step 311). The comparator U5b drives the transistor Q3 which energizes the reset coil of the latching relay K1 causing the relay contacts to change state. This relay action removes power from most of the controller 100, including the DC supplies, the isolator U3, and primary output 101, the reset coil, and the green and yellow LEDs D4 and D5, respectively. The operation de-energizes the output 101, thus removing power from the compressor 111 (Step 312).

The action of the latching relay K1 described above also closes a set of contacts powering the red LED D6 and the isolator U4 which energizes the auxiliary output 102, and thus the alarm circuit 112. The controller 100 is now locked into a condition wherein the compressor 111 is disabled and will remain in this condition until the controller 100 is manually reset by an operator (Step 313). Reset is accomplished by momentarily depressing the reset switch S1 on the controller 100. Reset creates a pulse to the set coil of the latching relay K1, thus returning the contacts to the previous state and restorinq operation of the controller 100 by clearing the timer U6 and the alarm circuit 112 (Steps 314 315). If the controller 100 still detects a lubrication fault, the timing interval will repeat and, after time-out, the unit will again go into the lock-out condition. If the fault has been corrected, the controller 100 will allow uninterrupted operation to resume after a clearing of the timer U6 (Step 308).

While a specific embodiment of the invention has been illustrated and described herein, it will be realized that numerous modifications and changes will occur to those of ordinary skill in the art.

What is claimed is:

1. An electronic controller which monitors a status of a compressor, comprising:
    fault detecting means for detecting a fault in said compressor;
    timing means, connected to said fault detecting means, for initiating a predetermined timing period in response to a fault detected by said fault detecting means;
    power means for providing power to said compressor, said power means responsive to said timing means, for disconnecting power to said compressor when the detected fault is not corrected within said predetermined timing period, and for continuing power to said compressor when said detected fault is corrected within said predetermined period;
    means for resetting said timing means when said detected fault is corrected within said predetermined timing period; and
    an alarm circuit which activates an alarm in response to the detection of a fault by said fault detecting means and which deactivates said alarm at the conclusion of said predetermined timing period only if said fault is not corrected within said timing period, and which deactivates said alarm during said timing period only if said fault is corrected within said timing period.

2. The electronic controller as claimed in claim 1 wherein said alarm circuit activates a second alarm in response to said detected fault not being corrected within said predetermined timing period.

3. The electronic controller as claimed in claim 2, wherein said fault detecting means comprises a transducer which monitors lubrication oil pressure of said compressor.

4. The electronic controller as claimed in claim 3, wherein a fault occurs when said monitored lubrication oil pressure is lower than a predetermined pressure threshold.

5. The electronic controller as claimed in claim 2, wherein the said fault detecting means comprises a current sensing relay which senses current to said compressor, and wherein a fault occurs when said current is not sensed.

6. The electronic controller as claimed in claim 1, further comprising:
    power loss means for detecting a loss of power to said controller; and
    delay timing means, connected to said power loss means, for initiating a predetermined time delay in response to a loss of power to said controller;
    means for preventing said power means from providing power to said compressor until after expiration of said predetermined time delay, thereby preventing short cycling of said compressor; and
    user actuable power resetting means for causing said power means to immediately re-connect power to said compressor.

7. A method for controlling a compressor, comprising the steps of:
    supplying a source of electrical power to a compressor controller;
    selectively energizing and de-energizing an output of said compressor controller which in turn supplies power to said compressor;
    detecting whether a loss of power to said compressor controller has occurred;
    determining whether the lubrication oil pressure equals or exceeds a predetermined threshold
    incrementing a first timer upon determining that the lubrication oil pressure does not equal or exceed said predetermined threshold so as to time a period during which said lubrication oil pressure is lower than said predetermined threshold;

activating a first alarm in response to the determination that the oil pressure does not equal to or exceed said predetermined threshold;

de-energizing said output and activating a second alarm when said first timer is incremented above a predetermined time limit; and implementing a predetermined delay before said output is re-energized after said output has been de-energized in response to a detection that a loss of power has occurred.

8. The method as claimed in claim 7, further including the steps of energizing said output and resetting said first timer in response to a determination that the lubrication oil pressure equals or exceeds a predetermined threshold.

9. A controller for a compressor comprising a power supply means for selectively supplying and interrupting electrical power to said controller;

detecting means for detecting an interruption of power supplied to said controller;

sensing means for detecting a fault in said compressor and for generating a first signal when a fault is detected;

first timer means responsive to the continuous presence of said first signal for generating a second signal after a predetermined time from initial presence of said first signal, said power means in response to said second signal interrupting the power to said controller; and alarm means, including a first indicator, for indicating the presence of said first signal and, including a second indicator, for indicating the absence of electrical power being supplied to said controller, said first indicator being inactive when said second indicator is active.

10. The controller of claim 9 including a second timer means responsive to an interruption in power provided to said controller for initiating a predetermined time delay before said power supply means initiates further supply of power to said controller.

11. The controller of claim 9 wherein said alarm means further indicates the presence of electrical power being supplied to said controller.

12. The controller of claim 11 in which said alarm means comprises first, second and third visual indicating means for visually displaying, respectively, the presence of said first signal, the presence of electrical power being supplied to said controller and the absence of electrical power being supplied to said controller.

13. The controller of claim 12 in which said first and second visual indicating means is inactive when said third visual indicating means is active.

14. The controller of claim 13 in which said first, second and third visual indicating means comprise, respectively, green, yellow and red light emitting diodes.

* * * * *